United States Patent Office 3,447,312
Patented June 3, 1969

3,447,312
MOUNT FOR MASS BODY AND PAWL IN
ELECTRICALLY WOUND CLOCKWORK
Albrecht Haag, Schwenningen am Neckar, Germany, assignor to Kienzle Uhrenfabriken G.m.b.H., Schwenningen am Neckar, Germany, a limited-liability company of Germany
Filed Apr. 27, 1967, Ser. No. 634,345
Claims priority, application Germany, Apr. 29, 1966,
K 59,124
Int. Cl. G04c 1/06
U.S. Cl. 58—40                                9 Claims

ABSTRACT OF THE DISCLOSURE

A plastic member serves as a bearing hub for an oscillatory disc shaped inertia body, the latter to be given an impulse in a substantially tangential member to elongate a helical spring stretched over a fusee-like axial projection of the hub. The member includes a radial portion bent over the peripheral portion of the inertia body to carry a pawl to drive a ratchet wheel as the driven wheel of a work train.

BACKGROUND OF THE INVENTION

*Field of the invention.*—An electrically wound clockwork wherein an oscillatory or turnable inertia body is given a tangential blow to rotate or turn it, and thereby distort a spring whose retraction drives the clockwork through a drive pawl. The invention particularly concerns the mounting of the inertia body on an eccentric or fusee-like plastic element on which a helical spring becomes stretched, and concerns the mode of mounting the pawl for spring-urging against a ratchet wheel as drive wheel for the clockwork.

*Description of the prior art.*—A source of trouble most commonly met with in electromagnetically wound spring driven timepieces is the drive pawl which serves as the working connection between the tension-power spring and the work train. The location of and the bearing for a kicked disc or inertia member carrying the pawl is a further source of troublesome failure. In order to equalize varying turning moment during its retraction, the tension spring is in the form of a helical spring, and the spring in its running down action does so on an eccentric or fussee-like peripheral portion on the usual massive oscillatory element given a winding direction blow by the magnet. In order for this type of spring to develop well equalized torque during running down action the effective retraction point of the tension spring must be accurately matched in relation to the eccentric or curvature of the fusee-like member. As a result of production inaccuracies this condition is often not obtained.

SUMMARY OF THE INVENTION

The present invention is a plastic eccentric or fusee-like member having a L-shaped arm to turn with the eccentric on a stub shaft, the arm also carrying the drive pawl. An inertia disc is also mounted fast on the eccentric, the latter serving as a bearing hub for the inertia disc to turn on the shaft.

The arm and eccentric are formed as one piece so that during assembly the point of attachment of the power spring end relative to the curved surface of the eccentric is fixed and so avoids some of the closer tolerances required in manufacture of matched parts. Furthermore with the eccentric or fusee-like part being of plastic, such a bearing hub requires little oil and the wind-up noise is minimized, while heretofore the impact on this bearing by the wind-up stroke was considerable. During production, difficulty in obtaining the proper curvature for the fusee-like element is no longer a problem with the invention, and the best possible shape for eliminating torque variations is obtained. There are further advantages when the drive wheel of the work train and the drive pawl cooperating with it are produced from plastic. The noise of the pawl is negligible as finer ratchet teeth on the drive wheel may be used and the pawl can be molded to close tolerances. The detaining force on the pawl can be reduced to a very small amount and yet there is dependable engagement during the drive phase, even though the mounting of the pawl is quite simple and requires very little lubrication.

DESCRIPTION OF PREFERRED EMBODIMENTS

Figure 1:
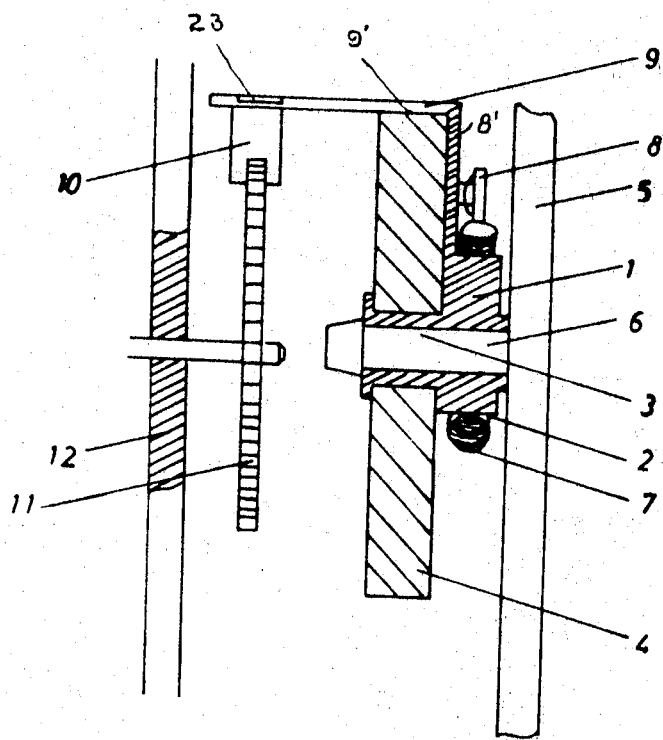
FIG. 1 shows the system of a periodically tensed spring driving a work train.

The invention includes a turnable unitary, plastic part generally designated 1, having an eccentric or fussee-like part 2 provided with an integral protruding hub portion 3, the latter having fast thereon a massive disc 4. The disc and eccentric 2 turn about a stub shaft 6 fixed on a work plate 5.

It is well known in the art to provide an electromagnet (not shown) for imparting a tangential blow to the disc, when the disc turns, during running of the timepiece, to a predetermined position. Such a blow is for stressing a power spring for driving the timepiece, the power spring here being in the form of a helical tension spring 7 at least partially being stretched over a peripheral portion of the eccentric or fusee-like part 3 and having one end attached thereto at a point 8 on an arm portion 8′ to be described later, and the other end to the work plate 5 in known manner. The pitch of the eccentric or fusee-like part relative to the points of attachment of the spring ends is such that as the spring retreats over the peripheral of the fusee-like part, due to the smoothness of the plastic the various coils of the spring can all adjust themselves to even out and avoid fluctuations in the resultant torque. The same action is true in the reverse during wind-up when binding heretofore was more apt to occur because the wind-up is sudden.

Figure 2:
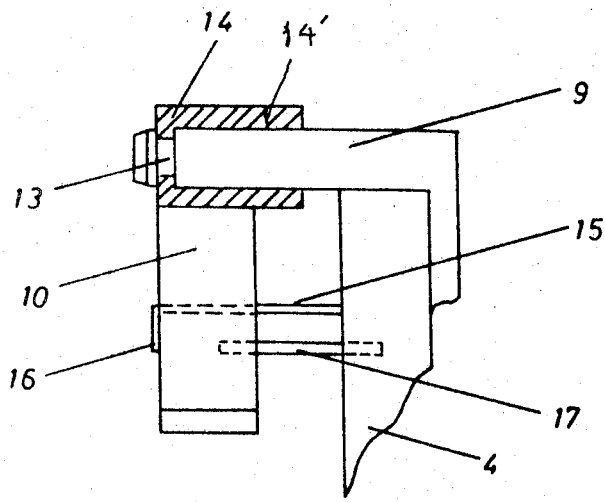
FIG. 2 shows a specfic means for mounting a pawl.

The arm 8′ previously referred to is also preferably provided with a long stud or rod 9 extending axially parallel with the stud shaft 3 and in the same direction and carrying a drive pawl 10 for engagement with a ratchet wheel 11 as the drive wheel of a clockwork mounted on the rear work plate 12. For strength, the long stud 9 may be disposed in an outwardly open slot 9′ in the disc 4. The end portion of the long stud is provided with a circumferential groove 13 so as to receive a corresponding projection 14 in the pawl bearing bore 14′ to retain the pawl on the stud 9. The necessary engagement pressure of the pawl on the wheel is produced (in FIG. 2) by projecting leaf springs 15 and 17 mounted fast with respect to the disc 4 and part 1 and extending axially parallel with the stud 9 so as to engage on the pawl. A leaf spring may have a right angularly bent end as at 16 to reduce tendency of the pawl to buckle or twist. The spring such as 17 may be secured substantially fast on the pawl and engage on the disc 4.

Figure 3:
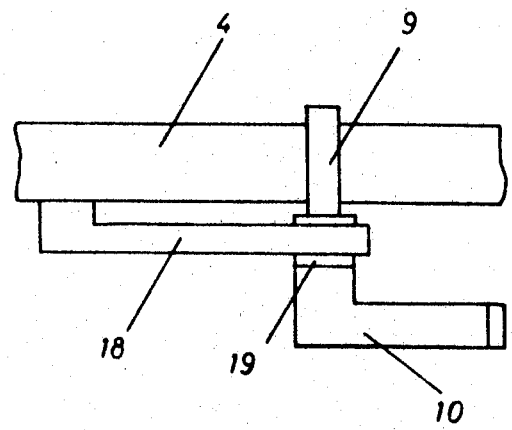
FIGS. 3 and 4 show a modification of the invention.
Figure 4:
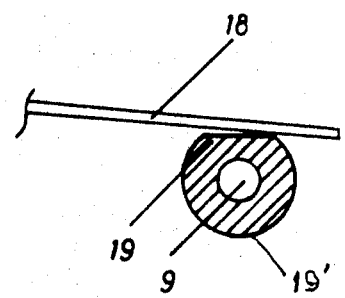
Figure 5:
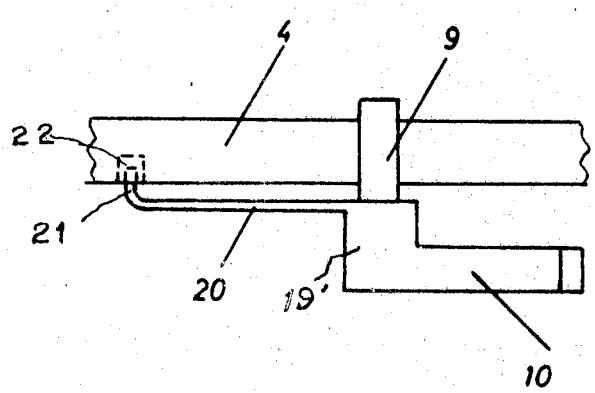
FIG. 5 shows yet another modification of the invention.

FIG. 3 shows a modification of the invention wherein the pawl spring 18 on the disc 4 extends perpendicularly to the rod 9, and the hub 19′ of the pawl is provided with an externally flat surface 19 on which the spring 18 presses as shown in FIG. 4. When there is an acute angle between the spring and the surface there is a tendency for the hub and pawl to turn on the rod 9 and so force the pawl against the wheel 11.

Instead of using a separate spring to bear on the hub, the pawl may be provided with an integral spring 20, having an end 21 detained in a hole 22 in the disc 4. In still simpler form as shown in FIG. 1 a blade spring inserted fast in the long rod 9 at 23 can assume the function of the pawl.

The chemical composition of the plastic for making the part 1 and its integral portions such as the hub are not critical but it should be essentially free from cold creep, lest it become distorted over a period of time. It is contemplated that the part be formed by molding so as to provide inherently smooth bearing surfaces. Phenolformaldehyde compositions may be used.

I claim:

1. In an electrically wound spring driven clockwork, a frame and stub-shaft projecting therefrom and fast thereon, an inertia body of generally disc shape turnable about the axis of the stub shaft, said body having a plastic hub portion fast therein and mounted on the shaft for turning thereon, said hub portion having an integral fusee-like portion of varying curvature between the body and the frame, a helical tension spring at least partially wrapped upon the fusee-like portion and tensed relative to the hub portion and frame for turning the hub portion on the frame as the spring becomes retracted, said hub portion being provided with an integral radial member, and pawl means on the radial member for engaging in a ratcheted drive wheel of the clockwork.

2. In a clockwork as claimed in claim 1, said radial member being right angularly bent and terminating in the form of a rod projecting in the same direction as does the stub shaft and the pawl means being a pawl mounted on said rod.

3. In a clockwork as claimed in claim 2, said rod being provided with a circumferential groove, and said pawl having a hub mounted to turn on the rod and provided with detent means projecting into the groove to retain the pawl on the rod.

4. In a clockwork as claimed in claim 3, and a leaf spring parallel to the rod for pressing the pawl against the wheel by reaction forces between the pawl and inertia body and mounted fast on the said pawl.

5. In a clockwork as claimed in claim 4, said leaf spring having a right angular bend about the pawl.

6. In a clockwork as claimed in claim 3 and a leaf spring perpendicular to the rod and mounted substantially fast with respect to the inertia body and on the pawl for urging the pawl into engagement with said wheel.

7. In a clockwork as claimed in claim 6 said hub of the pawl having an external flat surface parallel with the axis thereof and the leaf spring engaging on said flat surface at an acute angle.

8. In a clockwork as claimed in claim 1, said pawl means including a plastic resilient blade engaging on the wheel.

9. In a clockwork as claimed in claim 2, said body having a radially open slot in the peripheral portion of the body and said rod being disposed in the slot to strengthen the rod in the zone of the rod received in the slot.

References Cited

UNITED STATES PATENTS 2,935,160  5/1960  Lawson _____ 58—41
3,012,712  12/1961  Haupt _____ 58—41

RICHARD B. WILKINSON, Primary Examiner.

EDITH C. SIMMONS, Assistant Examiner.

U.S. Cl. X.R.

58—41